US012637390B2

(12) United States Patent　　　　(10) Patent No.:　　US 12,637,390 B2
Shapiro et al.　　　　　　　　　　　(45) Date of Patent:　　　May 26, 2026

(54) HIGH COMPRESSIVE STRENGTH POLYMER GROUT AND METHOD OF MAKING

(71) Applicants:Lawrence S. Shapiro, Branford, CT (US); Michael K. Harvey, Madison, CT (US); Scott Atom Saverse, New Haven, CT (US); Douglas A. Cheney, Waterbury, CT (US); Zbigniew Andrew Szczepaniak, New Britain, CT (US); Brandon Michael Belcher, Friendswood, TX (US); Paul Matz, Munster, IN (US); Timothy Patrick Fitzgerald, Kingsland, GA (US); Shawn Thomas Noble, New Orleans, LA (US)

(72) Inventors: Lawrence S. Shapiro, Branford, CT (US); Michael K. Harvey, Madison, CT (US); Scott Atom Saverse, New Haven, CT (US); Douglas A. Cheney, Waterbury, CT (US); Zbigniew Andrew Szczepaniak, New Britain, CT (US); Brandon Michael Belcher, Friendswood, TX (US); Paul Matz, Munster, IN (US); Timothy Patrick Fitzgerald, Kingsland, GA (US); Shawn Thomas Noble, New Orleans, LA (US)

(73) Assignee: Five Star Products, Inc., Shelton, CT (US)

( * ) Notice: Subject to any disclaimer, the term of this patent is extended or adjusted under 35 U.S.C. 154(b) by 773 days.

(21) Appl. No.: 17/983,369

(22) Filed: Nov. 8, 2022

(65) Prior Publication Data

US 2024/0150242 A1　　May 9, 2024

(51) Int. Cl.
| | |
|---|---|
| *C04B 26/14* | (2006.01) |
| *C04B 14/06* | (2006.01) |
| *C04B 24/12* | (2006.01) |
| *C04B 24/42* | (2006.01) |
| *C04B 103/14* | (2006.01) |
| *C04B 103/40* | (2006.01) |
| *C04B 111/70* | (2006.01) |

(52) U.S. Cl.
CPC .............. *C04B 26/14* (2013.01); *C04B 14/06* (2013.01); *C04B 24/121* (2013.01); *C04B 24/42* (2013.01); *C04B 2103/14* (2013.01); *C04B 2103/40* (2013.01); *C04B 2111/70* (2013.01); *C04B 2201/52* (2013.01)

(58) Field of Classification Search
CPC ....... C04B 26/14; C04B 14/06; C04B 24/121; C04B 24/42; C04B 40/065; C08G 59/50; C08G 59/5006; C08G 59/5026; C08G 59/5033
USPC ......................................................... 523/443
See application file for complete search history.

(56) References Cited

U.S. PATENT DOCUMENTS

| | | | |
|---|---|---|---|
| 9,444,884 | B2 | 9/2016 | Newton et al. |
| 2016/0230043 | A1 | 8/2016 | Mania et al. |
| 2017/0009122 | A1 | 1/2017 | Funkhouser et al. |
| 2019/0185377 | A1 | 6/2019 | Cakmak et al. |
| 2020/0087552 | A1 | 3/2020 | Gerber et al. |
| 2021/0348397 | A1 | 11/2021 | Caselli et al. |
| 2021/0355030 | A1* | 11/2021 | Aou ........................ C04B 20/12 |
| 2022/0018078 | A1* | 1/2022 | Szczepaniak ...... C08G 59/5026 |

OTHER PUBLICATIONS

English Translation of CN 103482904. (Year: 2014).*

* cited by examiner

*Primary Examiner* — Hannah J Pak

(74) *Attorney, Agent, or Firm* — Robert J. Lauf

(57)　　　　　　　ABSTRACT

A three-part epoxy grout composition comprises a liquid epoxy blend, a liquid hardener, and a graded particulate aggregate, wherein the dry aggregate particles are pretreated with an applied adhesion promoter in an amount of 0.01 to 5% by weight. The volume of pretreated aggregate particles, when mixed with the epoxy blend and the hardener, comprises at least 70% by volume of the cured grout. Pretreatment of the aggregate by coating with adhesion promoter allows more efficient use of chemicals along with improved strength. Related methods are also disclosed.

5 Claims, 9 Drawing Sheets

THIS INVENTION

THIS INVENTION

HIGH COMPRESSIVE STRENGTH POLYMER GROUT AND METHOD OF MAKING

BACKGROUND OF THE INVENTION

Field of the Invention

The invention pertains to construction materials and methods. More particularly, the invention pertains to high compressive strength grouts useful in the placement of towers onto concrete foundations.

Description of Related Art

Renewable energy derived from wind is most often achieved by the use of large steel towers that support large electric generating turbines turned by large rotor blades. These towers can routinely be as tall as 120 m. Current practice in the construction of these towers is to build a large concrete foundation that extends sufficiently outward from the tower base and sufficiently deep into the ground to provide a stable base for the tower.

Towers not only exert static downward forces on the foundation because of their great mass, but also exert significant dynamic loads on the foundation as a result of wind loading on the tower and the blades of the wind turbine. To adequately anchor the tower to its base, long bolts are set in 2 concentric circles in the concrete foundation. These bolts extend from the bottom of the foundation all the way up through the top of the foundation. The wind tower, which has a circular cross section at its base, has a flange extending outwardly and inwardly, with holes to fit over the two concentric rings of bolts extending up through the concrete foundation.

It is critical that static and dynamic loads exerted by the tower are adequately transferred from the tower to its foundation; this also requires that the forces at the tower base are not strong enough nor sufficiently concentrated at any one point to overcome the compressive strength of the concrete foundation. Neither the top surface of the concrete foundation nor the bottom surface of the tower base are completely flat and may not be completely parallel at every point. Providing a connection that is in substantially complete contact with both the top surface of the concrete foundation and the bottom surface of the tower base is therefore critical.

Current practice is to install a layer of non-shrink cementitious or epoxy-based grout between the wind tower base and the concrete foundation. The grout layer is typically poured into place between the tower base and the foundation, with the tower supported by shims placed on the foundation to keep the tower raised above the foundation thereby allowing the grout layer to be installed.

The grout is installed to a depth such that it is in contact with the underside of the tower base. It is formulated not to shrink as it sets or cures in order to maintain that contact, leaving complete contact with both the bottom of the tower base and the top of the concrete foundation. Typically, the grout layer extends past the tower base flange both on the inside diameter and the outside diameter. This facilitates pouring the grout layer, but it also spreads the forces exerted by the tower on the concrete, ensuring that localized forces do not exceed the compressive strength of the concrete foundation.

Grouts in use today typically have compressive strengths of 10,000 to 17,000 psi with a few claiming as high as 20,000 psi. In addition, epoxy-based grouts traditionally have thickness limitations because they are exothermic when they cure and if poured in large volumes they can get hot enough to cause them to crack when they cool.

Current grout technologies also have a limit on how much further they can extend beyond load-exerting structure resting on them. In the example of a wind tower, conventional epoxy-based grouts limit the amount of grout placed beyond the exterior or interior diameters of the tower base flange (called the shoulder area). This limitation is due to difference in the coefficient of thermal expansion (CTE) between the steel wind tower and the concrete foundation (which are very similar) and the grout (which tends to be much higher). At low ambient temperatures, the grout will tend to shrink at a different rate than concrete foundation to which it is adhered, and this will cause the shoulder to curl upward, separating the grout from the concrete surface and eliminating its ability to transfer any forces between the tower and the foundation.

Grouts spread compressive forces as a function of their depth and breadth. To accomplish this in a wind tower application, as the forces increase, the grout layer must become deeper and wider to sufficiently reduce the load concentration in the concrete foundation. The current trend is toward towers that generate more electricity and are built in lower quality wind resource geographies. Both of these factors require taller towers with larger turbines. This naturally increases the forces on the tower base, the grout layer and the concrete foundation. The forces exerted by these taller towers are sufficiently large to exceed both the compressive strength of available grout materials and the necessary depth and breadth of the grout to needed to reduce the load concentration so that localized loads are below the compressive strength of the concrete foundation.

In such cases current practice is to install a steel spreader plate under the tower that is wider than the tower base compared to both the external and internal diameter of the tower base flange. Grout is then installed beneath the spreader plat as in the typical way. The function of the spreader plate is to spread the load exerted by the tower to the extent it is below the compressive strength of the grout and that the grout, poured up to its maximum allowable thickness is able to spread the load sufficiently to keep them below the compressive strength of the concrete foundation. In a large tower, the steel spreader plate might weigh as much as 3 to 4 tons and cost more than $20,000.

It would be useful, therefore, to have a foundation system that can eliminate the large and costly steel plate and ideally replace it with a convenient, cast-in-place member to serve as the load spreading device between the tower and the concrete base.

Objects and Advantages

Objects of the present invention include the following: providing an ultra-high strength grout composition having similar flow characteristics to conventional grouts for similar applications; providing a grout having a high loading of aggregate treated with an adhesion promoter; providing a method of making polymer-based grout; providing a prepackaged aggregate mix that is pretreated with an adhesion promoter; providing a prepackaged and premeasured grout kit that reduces dust and is easier to mix; and providing a polymer grout composition having increased aggregate loading and improved adhesion between the polymer matrix and the grout particles. These and other objects and advantages of the invention will become apparent from consideration of the following specification, read in conjunction with the drawings.

SUMMARY OF THE INVENTION

According to one aspect of the invention, an epoxy grout composition comprises:

a liquid epoxy blend;

a liquid hardener;

a particulate filler comprising:

30 to 70% of a first particulate material having a size range of +16 mesh;

10 to 40% of a second particulate material having size range of −16 to +40 mesh;

5 to 30% of a third particulate material having size range of −40 to +140 mesh; and, a fourth particulate material comprising fine filler; and wherein:

the particulate filler is pretreated with an applied adhesion promoter in an the amount of 0.01 to 2% by weight.

According to another aspect of the invention, an epoxy grout kit comprises:

a first sealed package holding a first premeasured quantity of a liquid epoxy blend having a viscosity of 200 to 2000 cps;

a second sealed package holding a second premeasured quantity of a liquid hardener having a viscosity of 30 to 800 cps; and, a third package holding a third premeasured quantity of a dry particulate filler comprising a graded aggregate of sand and fine filler, and an applied adhesion promoter in the amount of 0.01 to 2% by weight, wherein:

the premeasured quantities of the liquid epoxy blend and hardener, when combined with the premeasured quantity of dry particulate filler, produces a flowable grout composition having a solids content of at least 70% by volume.

According to another aspect of the invention, an epoxy-based grout composition is characterized by:

a compressive strength at 28 days of at least 19,000 psi;

a coefficient of thermal expansion in the range of 9 to 14 μstrain/° F.; and, sufficient aggregate content so that a body up to 14" thick may be poured without generating damaging exothermic temperatures during cure.

According to one aspect of the invention, an epoxy grout composition comprises:

a liquid epoxy blend;

a liquid hardener;

a particulate filler comprising particles having a selected blend of particle sizes and amounting to at least 70% of the combined volume of the particulate filler, the resin, and the hardener, and wherein:

the particulate filler particles are precoated with an applied adhesion promoter in an amount of 0.01 to 5% by weight of particles.

According to another aspect of the invention, an epoxy grout kit comprises:

a first sealed package holding a first premeasured quantity of a liquid epoxy blend having a viscosity of 200 to 2000 cps; a second sealed package holding a second premeasured quantity of a liquid hardener having a viscosity of 30 to 800 cps; and, a third package holding a third premeasured quantity of a dry particulate filler comprising particles having a blend of particle sizes and amounting to at least 70% of the combined volume of the particulate filler, the resin, and the hardener, and wherein the particulate filler particles are precoated with an applied adhesion promoter in an amount of 0.01 to 5% by weight of particles: and wherein:

the premeasured quantities of the liquid epoxy blend and hardener, when combined with the premeasured quantity of dry particulate filler, produces a flowable grout composition.

According to another aspect of the invention, a foundation system for a tower comprises:

a cast in place reinforced concrete foundation comprising two concentric rings of bolts extending a selected distance upward from its upper surface;

a cast in place polymer grout ring formed on top of the foundation and extending a first selected distance outward beyond the outer concentric ring, a second selected distance inward beyond the inner concentric ring, and a third selected distance upward, leaving the two concentric rings of bolts partially exposed above the grout;

wherein:

the reinforced concrete has a compressive strength of at least 3000 psi;

the polymer grout has a compressive strength at 28 days of at least 20,000 psi; and, the polymer grout contains at least 70% by volume of inorganic aggregate.

According to another aspect of the invention, a foundation system for a tower comprises:

a cast in place reinforced concrete foundation comprising two concentric rings of bolts extending a selected distance upward from its upper surface;

precast shims of polymer composite having a selected shape and resting upon the concrete at selected points around the circumference of the rings of bolts;

a steel structure resting on the precast shims and held in place with bolts;

a cast in place polymer grout ring formed between the top of the foundation and the steel structure, and surrounding the precast shims and extending a first selected distance outward beyond the outer concentric ring, a second selected distance inward beyond the inner concentric ring, and wherein:

the cast in place polymer grout and the precast polymer composite shims have the same composition.

According to another aspect of the invention, a foundation shim for a tower comprises:

a precast polymer composite body comprising a prismatic shape having two flat parallel surfaces and a selected outline, wherein:

the composite body comprises an epoxy resin and at least 75% by volume of inorganic aggregate; and, the composite body has a compressive strength of at least 20,000 psi.

According to another aspect of the invention, a method for preparing a foundation system for a tower comprises:

forming a cast in place reinforced concrete foundation comprising two concentric rings of bolts extending a selected distance upward from its upper surface;

placing precast shims of polymer composite having a selected shape upon the concrete at selected points around the circumference of the rings of bolts;

placing a steel structure on the precast shims and holding it in place with bolts;

casting in place a polymer grout ring between the top of the foundation and the bottom of the steel structure, and surrounding the precast shims and extending a first selected distance outward beyond the outer concentric ring, a second selected distance inward beyond the inner concentric ring, and wherein:

the cast in place polymer grout and the precast polymer composite shims have the same composition.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

FIG. 8A shows an oblique view of a single shim; FIG. 8B shows how the shim is placed onto the concrete foundation.

FIG. 9A shows an oblique view of a single shim;

FIG. 9B shows how the shim is placed onto the concrete foundation.

DETAILED DESCRIPTION OF THE INVENTION

Figure 1:
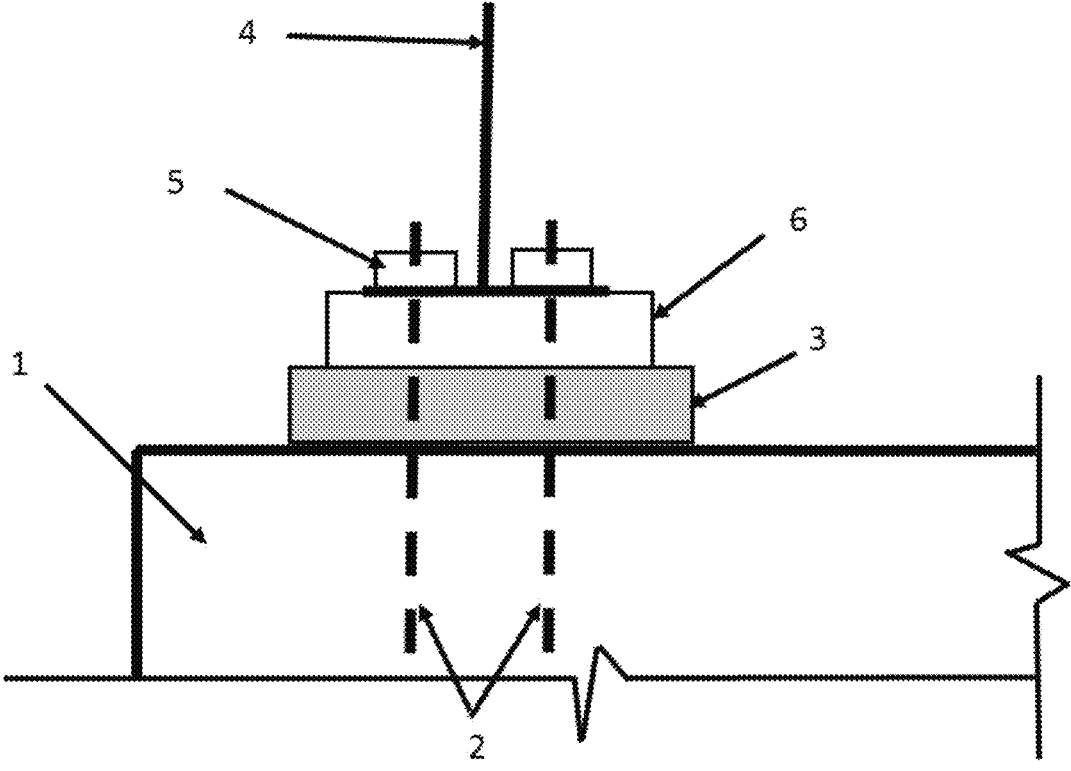
FIG. 1 is a schematic diagram of a typical transition structure used in wind tower foundations according to the Prior Art.

The present invention is an epoxy based grout that has ultra-high compressive strength, the ability to be poured at depth up to 14" thick without generating crack inducing temperatures during its exothermic cure, and the ability to have large enough shoulders to sufficiently spread higher loads without the shoulders curling, such that it can be used to replace the steel spreader plates in foundation structures for tall wind towers.

The inventive system is characterized by several properties, which have clear performance benefits:

1. Very high aggregate loading provides greater strength and lower exothermic heat generation during curing. It also reduces cost because by volume sand is less costly than resin.
2. Careful tailoring of the particulate phase provides a grout that retains good flowability even at such higher aggregate loadings.
3. The dry aggregate is pre-coated with an adhesion promoter, rather than adding the adhesion promoter to one of the liquid components as is the traditional practice. This allows the formula to be optimized so that the adhesion promoter is added in the right amount to adequately bind to the particles, while avoiding wasted material. It further minimizes the amount of adhesion promoter that never makes it to a particle surface and would end up weakening the polymer network.

The following examples will further illustrate and make clear various aspects of the inventive method and the performance of the inventive grout systems.

The new epoxy system of the present invention combines conventional liquid resin and hardener with a novel flowable, graded aggregate that is pre-treated with an adhesion promoter before mixing with the resin and hardener. Applicants have found that this material, when mixed and cast in place, is able to withstand extremely high compressive loads after curing. The epoxy of the present invention is a two-part system, in which the compositions of Part A (resin blend) and Part B (hardener) are summarized in Tables 1 and 2, respectively.

TABLE 1

| Part A composition | | |
| --- | --- | --- |
| Component | Range (wt. %) | Intended role |
| Epoxy resin blend | 95-100 | reactive resin, structural |
| Surfactant[a] | 0-5 | flow, levelling, surfactant |

[a]Modaflow ® Resin, Acrylic Copolymer, (Allnex USA Inc.), BYK 066N or BYK A-535 (BYK Chemie, Wallingford, CT), 2,6-Dimethylheptan-4-one, 4,6-Dimethyl-2-heptanone, mineral oil, benzyl alcohol or any suitable air controlling additive. This may include plasticizers or other ingredients that function synergistically in either the Part B or Part A compositions.

One suitable epoxy resin blend is a custom blend of bisphenol F, and neopentylglycoldiglycidyl ether. Those skilled in the art will appreciate that many suitable epoxy systems are known, including any aromatic epoxy resins, such as: bisphenol A, bisphenol F, bisphenol E, resorcinol DGE, aliphatic and aromatic mono- and di-glycidyl ethers thereof. For the present application, suitable epoxy resin blends typically have a viscosity in the range of 200 to 2000 cps.

TABLE 2

| Part B composition | | |
| --- | --- | --- |
| Component | Range (wt. %) | Intended role |
| Epoxy curing agents blend[a] | 95-100 | Curing agent, structural |
| Surfactant[b] | 0-5 | Viscosity diluent, accelerator |

[a]Any standard curing agent as are known in the art
[b]Can be BYK-066N or BYK A-535 (BYK USA Inc., Wallingford CT), mineral oil, or other surfactants listed as air release or defoaming agents. This may include plasticizers or other ingredients that function synergistically in either the Part B or Part A compositions.

Those skilled in the art will appreciate that many curing agents are commonly available for epoxy systems, including cyclohexanemethanamine, 5-amino-1,3,3-trimethyl-, any cycloaliphatic mono-, di-, and tri-amine, isophoronediamine (IPDA), aliphatic amines, and aromatic amines. Those skilled in the art will further appreciate that many commercially available adhesion promoters are commonly available for epoxy curing agents, e.g., amino functional silanes, such Silquest, A-1100 A-1110, A-1120(J), A-2120, A-1170, Y-9627, Y-11699, A-1524, A-Link 15, or even VS 142, A-1106 (waterborne) silanes and similar ones, as adhesion promoters, are good for addition to epoxy hardeners for a simple reason: they do not react with the hardener and they are stable in its environment. On the other hand, glycidoxy functionalized silanes like Silquest A-186, A-187, A-1871 and others are added to epoxy resin for the same reason, the same functionality. Also, other reactive functionalities might be used in epoxy such as (meth)acrylic—e.g. Silquest A-174NT Silane which would also react with amine-epoxy based system, but are stable in epoxy. Those skilled in the art will appreciate that in some circumstances it is possible to mix the additive (here adhesion promoter) with the opposite functionality (e.g. amine based promoter with epoxy). The adhesion promoter would then react here with the epoxy (or in the opposite case, with the amine) making, after the reaction, the promoter molecule much bigger, less mobile, less reactive. This methodology is possible, however in most cases it would be less effective and desirable. For the present application, suitable epoxy curing agent blends typically have a viscosity in the range of 30 to 800 cps.

Figure 6:
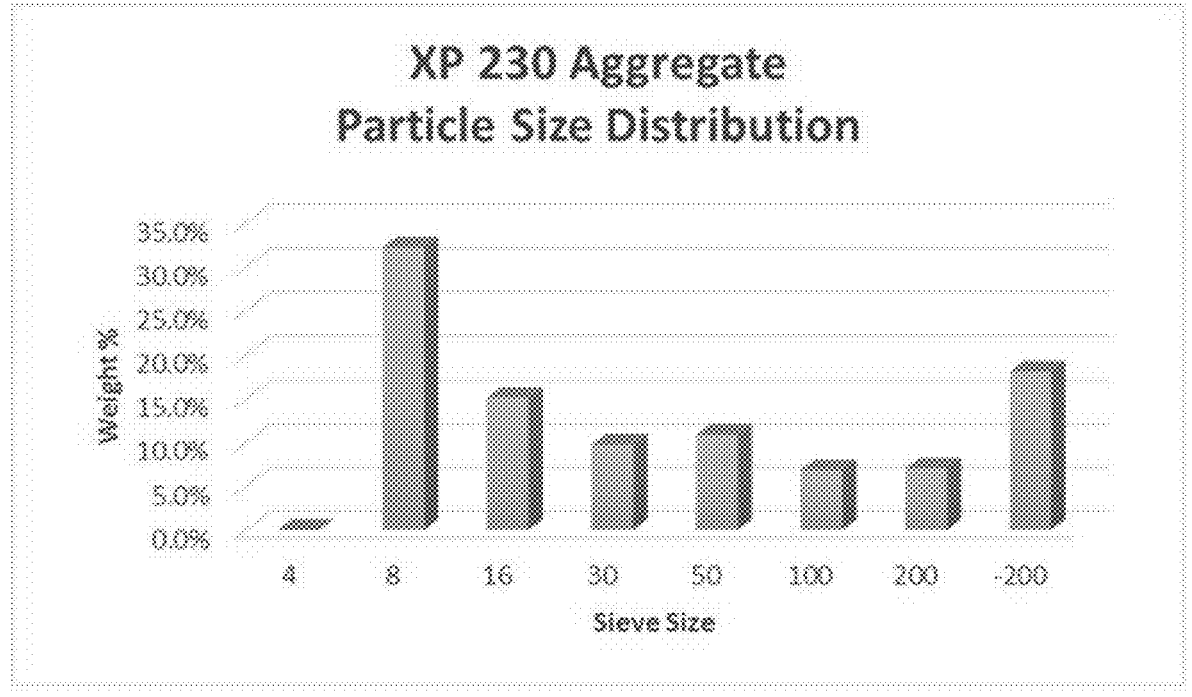
FIG. 6 is a schematic representation of the particle size distribution of a grout aggregate in accordance with some aspects of the invention.

The new aggregate of the present invention is a combination of carefully chosen sized particulates, with the carefully chosen size ratios, and surface treated with adhesion promoter. The composition of Part C (aggregate) is summarized in Table 3. A representative sieve analysis of the aggregate mixture produced by the inventive method is shown in FIG. 6

TABLE 3

| | | Part C composition | |
| Component[a] | Mesh range | Range (wt. %) | Intended role |
| --- | --- | --- | --- |
| Particulate material 1 | −6 + 14 | 30-70 | Filler, structural |
| Particulate material 2 | −16 + 40 | 10-40 | Filler, structural |
| Particulate material 3 | −50 + 150 | 5-30 | Filler, structural |
| Particulate material 4 | can vary | 5-30 | Filler, flow |
| Adhesion promoter[b] | Liquid | up to 5 | Adhesion promoter |

[a]Material 1 is sand, nominally −6 + 14 mesh. Material 2 is rounded sand −16 + 40 mesh. Material 3 is Oklahoma #1 sand which is very rounded and finer than material 2. Material 4 is fly ash.
[b]Andisil ® 187 Silane [AB Specialty Silicones, Waukegan, IL 60087], glycidoxypropyltrimethoxysilane CAS# 2530-83

The adhesion promoter in this case was glycidoxypropyltrimethoxysilane. It is an epoxy functional silane used as a coupling agent for unsaturated polyester-fiberglass composites, for polysulfide/polyurethane caulks and sealants, and for inorganic fillers in epoxy composites. Other adhesion promoters include the following: glycidoxypropyltrimethoxy silanes, glycidoxypropyltriethoxy silanes, aminopropyltrimethoxy silane, aminopropyltriethoxy silanes, or combinations of methoxy and ethoxy groups on the silicone element. Also the linkage between Si and amino or epoxy functionality does not have to be 'propyl'—it could be a different number of carbons present, however those listed are common. The listed compounds are preferred adhesion promoters; however, it will be appreciated that there are other functionalities available, but some might be less effective depending on the particular formulations being used. Amino functional silanes such as Silquest, A-1100 A-1110, A-1120(J), A-1170, Y-9627, Y-11699, A-1524, A-Link 15, or even VS 142, A-1106 (waterborne) silanes and similar ones, are typically added to the hardener since if added to epoxy they would have reacted with the resin and vice versa: amines to amines and epoxies to epoxies. Those skilled in the art will appreciate that the particular amount of adhesion promoter, in terms of wt. % of aggregate will vary based on a number of considerations. For example, a promoter having a higher molecular weight will naturally require a greater mass for a given number of active sites on the aggregate particles than would be required for one of smaller molecular weight. Applicants generally prefer that the amount of adhesion promoter be in the range of 0.01 to 5% by weight of aggregate, and more preferably 0.01 to 2%, and still more preferably 0.1 to 2%. Guided by the teachings herein, the amount can be optimized for a particular mix through routine experimentation by the skilled artisan.

As a result of careful formulation using proper gradation in the sizes of particulate materials, with the optimized ratios, a volumetric load of 82% was achieved (this represents dry aggregate in a beaker with gentle tapping to settle the particles.) High loading is important because the aggregate is the strongest part of the formula and should therefore be maximized. Applicants have used fly ash as the fine filler in some particular examples, but those skilled in the art understand that "fine filler" generally describes a powder fraction that is often −200 mesh, and various materials may be used for this fraction, including cement, ground limestone, precipitated calcium carbonate, silica flour, etc.

It will be appreciated that the interface between liquid polymer and aggregate surface is very important to the strength of the whole system. An untreated surface, with low adhesion (like a cold joint), would be the weakest link and under high compressive stresses it would be the likely place for crack initiation leading to failure. Applicants have discovered that this bond between the polymer and particulate material can be greatly enhanced by pretreating the dry aggregate directly with the adhesion promoter, rather than simply adding the adhesion promoter to one of the liquid components (Part A or Part B), as is currently done in the art.

Applicants speculate that the reason directly mixing the adhesion promoter to the dry aggregate has proven to give superior results is because the reactive sites on the particulate surface, e.g., in silica sand, are typically hydroxyl groups. If the adhesion promoter is added in the liquids it might not be as effective in reaching those surface hydroxyl groups. Experimental results confirm this, with better than a 1,000 psi strength improvement for aggregate treatment vs. liquid addition. It will be also appreciated that there is finite surface area of the particulate material blend, and this surface area is in principle known (determined by the particle size distribution) and can be measured by BET analysis, for example. That known area/interface can be therefore treated with the optimum amount of the adhesion promoter. The amount of adhesion promoter can be precisely determined to reach all of the finite reaction sites on the available particulate material surface. Not enough promoter will yield lower results. At the same time, any extra amount of adhesion promoter would chain-terminate the epoxy network, acting like a monofunctional reactive diluent, making the network less dense, and as a result the cured composite would be weaker.

Rather than attempting to calculate the optimal amount of adhesion promoter using the powder surface area and assumptions about the density of active surface sites, Applicants performed a series of experiments in which dry aggregate samples were treated with increasing amounts of adhesion promoter. When further additions had no more effect on cured strength, it was concluded that the active surface sites were saturated.

In the traditional art it is well known that air entraining can also improve the flow properties of epoxy being poured at the job sites. However, when high strength material is desired air must be avoided at all cost. The air present in the system will not provide any strength and would be seen as pinholes and/or bubbles of empty space.

The flowability of the present invention was achieved by using a combination of fine particulate materials used in the aggregate. This highly filled material, with 82% by volume (dry) of particulate fill, could match some of the existing materials with only 77.2% volumetric loads (dry).

Example

Optimizing volumetric aggregate load. The hypothesis is that with a higher volumetric load of the aggregate, then there will be more of the stronger strength interaction of the polymer/particle interface and less of the lower strength polymer. It is common knowledge in epoxy grouts that the more bags of the aggregate per bucket of resin, the greater will be the compressive strength of the material. So the basic design approach was to target 'packing' of the aggregate itself so that the grout mixture contains less liquids. The most efficient packing of monosized spheres, hexagonal close packing, is 0.74 (i.e., 26% of the total volume will be voids between the spheres. It is also known that if the right amount of secondary, smaller size spheres are added to fit the void spaces between the larger particles, the volumetric packing can be increased to 0.91. So in theory, by selecting the right size particle ratios (to better fit the empty spaces) one will be able to maximize the volumetric load. However, one must keep in mind that raw particulate construction materials such as sand, while they might be generally rounded, are far from being ideal spheres. Maximizing the aggregate load was therefore performed by mixing various ratios of particulates 1, 2, 3, and 4 and measuring the mixed dry weight of known volume in a beaker, with gentle tapping to settle the contents. Initially coarse particulate 1 was excluded from the testing because it was too angular in morphology compared to the rest of material. Initial testing is summarized in Table 4.

TABLE 4

Maximizing volumetric load by varying ratios of the particulates

| Particulate 1[a] % | Particulate 2[b] % | Particulate 3[c] % | Particulate 4[d] % | Volume load % |
|---|---|---|---|---|
| FSP standard aggregate (for comparison)[e] | | | | 77.16% |
| — | 70.00 | 30.00 | — | 67.01% |
| — | 75.00 | 25.00 | — | 66.61% |
| — | 80.00 | 20.00 | — | 66.58% |
| — | 85.00 | 15.00 | — | 66.25% |
| — | 65.00 | 35.00 | — | 69.12% |
| — | 60.00 | 40.00 | — | 69.22% |
| — | 55.00 | 45.00 | — | 68.92% |
| — | 50.00 | 50.00 | — | 68.80% |
| — | 35.00 | 100.00 | — | 63.29% |
| — | 100.00 | 35.00 | — | 64.80% |

Figure 5:
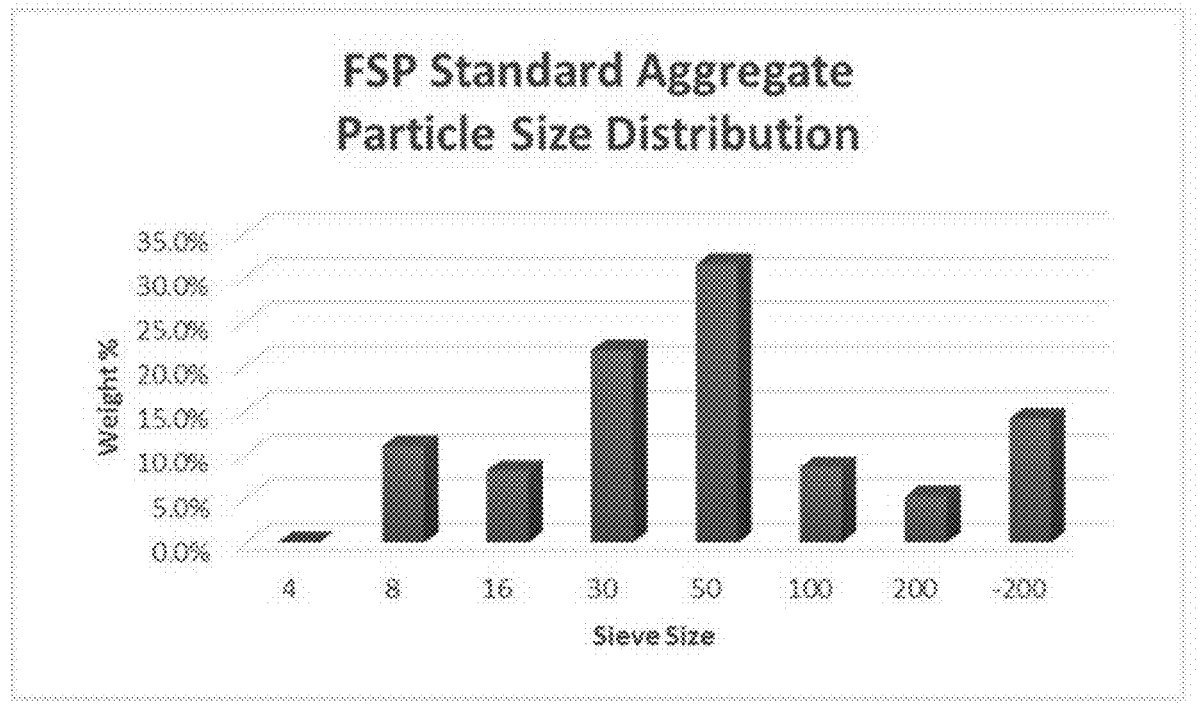
FIG. 5 is a schematic representation of the particle size distribution in a grout aggregate in accordance with the Prior Art.

[a,b,c,d]Particulate materials 1-4 are as defined earlier in Table 3
[e]A representative sieve analysis is presented in FIG. 5 and in Table 6 below.

Example

The most favorable combination of particulate 2 and 3 from Table 4 was used in a further tests (three parts of particulate 2 and two parts of particulate 3). To this mixture, the level of the particulate 1 was started at 40%, 50%, 60%, and 70%. Then, for each level of particulate 1, 2, and 3, the mix was further optimized using particulate 4 (fly ash) added in amounts ranging from about 11 to 17% to maximize volumetric load. The summary of the test is given in Table 5.

TABLE 5

Maximizing volumetric load by running dry ratios of the particulates

| Particulate 1[a] | Particulate 2[b] | Particulate 3[c] | Particulate 4[d] | Volume load, % | Comments |
|---|---|---|---|---|---|
| 40.00 | 36.00 | 24.00 | — | 71.16% | ratio of 1:2:3 held constant |
| 34.80 | 31.32 | 20.88 | 13.00 | 78.68% | ratio of 1:2:3 held constant |
| 34.40 | 30.96 | 20.64 | 14.00 | 79.51% | ratio of 1:2:3 held constant |
| 34.00 | 30.60 | 20.40 | 15.00 | 79.66% | ratio of 1:2:3 held constant |
| 33.60 | 30.24 | 20.16 | 16.00 | 79.67% | ratio of 1:2:3 held constant |
| 33.20 | 29.88 | 19.92 | 17.00 | 78.71% | ratio of 1:2:3 held constant |
| 50.00 | 30.00 | 20.00 | — | 71.29% | ratio of 1:2:3 held constant |
| 44.00 | 26.40 | 17.60 | 12.00 | 79.04% | ratio of 1:2:3 held constant |
| 43.50 | 26.10 | 17.40 | 13.00 | 79.77% | ratio of 1:2:3 held constant |
| 43.00 | 25.80 | 17.20 | 14.00 | 80.31% | ratio of 1:2:3 held constant |
| 42.50 | 25.50 | 17.00 | 15.00 | 79.80% | ratio of 1:2:3 held constant ratio of 1:2:3 held constant |
| 42.00 | 25.20 | 16.80 | 16.00 | 79.63% | ratio of 1:2:3 held constant |
| 60.00 | 24.00 | 16.00 | — | 70.07% | ratio of 1:2:3 held constant |
| 52.80 | 21.12 | 14.08 | 12.00 | 80.10% | ratio of 1:2:3 held constant |
| 52.20 | 20.88 | 13.92 | 13.00 | 80.18% | ratio of 1:2:3 held constant |
| 51.60 | 20.64 | 13.76 | 14.00 | 80.77% | ratio of 1:2:3 held constant |
| 51.00 | 20.40 | 13.60 | 15.00 | 82.04% | ratio of 1:2:3 held constant |
| 50.40 | 20.16 | 13.44 | 16.00 | 81.17% | ratio of 1:2:3 held constant |
| 49.80 | 19.92 | 13.28 | 17.00 | 80.54% | ratio of 1:2:3 held constant |
| 70.00 | 18.00 | 12.00 | — | 69.33% | ratio of 1:2:3 held constant |
| 62.30 | 16.02 | 10.68 | 11.00 | 78.81% | ratio of 1:2:3 held constant |
| 61.60 | 15.84 | 10.56 | 12.00 | 79.49% | ratio of 1:2:3 held constant |
| 60.90 | 15.66 | 10.44 | 13.00 | 81.08% | ratio of 1:2:3 held constant |
| 60.20 | 15.48 | 10.32 | 14.00 | 80.06% | ratio of 1:2:3 held constant |
| 59.50 | 15.30 | 10.20 | 15.00 | 80.52% | ratio of 1:2:3 held constant |
| 58.80 | 15.12 | 10.08 | 16.00 | 79.67% | ratio of 1:2:3 held constant |

[a,b,c,d]Particulate materials 1-4 are as defined earlier in Table 3

TABLE 6

Percent of retained sample after sieve analysis

| Sieve No | FSP Standard Aggregate Prior Art | XP 230 Aggregate This invention |
|---|---|---|
| 4 | 0.0 | 0.0 |
| 8 | 10.9 | 32.2 |
| 16 | 8.1 | 15.1 |
| 30 | 21.7 | 9.8 |
| 50 | 31.4 | 10.9 |
| 100 | 8.5 | 6.8 |
| 200 | 5.2 | 7.0 |
| Pan | 14.0 | 18.1 |

Example

Based on the previous tests showing the influence of aggregate mixtures on dry density, Applicants selected the mixes that gave the highest bulk densities in the three groups based on nominally 50, 60, and 70% of particulate 1. The dry aggregate was pre-treated with Silquest A-1100 Silane, amino-silane adhesion promoter (Momentive Performance Materials, Friendly, WV) and then mixed with Part A and Part B according to standard practice. The results, Table 7, show that four of the five formulations had a compressive strength >26,000 psi.

TABLE 7

Properties of epoxy grouts with high volumetric loading of aggregate[a].

| Batch | A | B | C | D | E |
|---|---|---|---|---|---|
| Particulate 1 | 36.30 | 31.60 | 42.90 | 50.90 | 60.80 |
| Particulate 2 | 33.50 | 29.10 | 25.70 | 20.30 | 15.60 |
| Particulate 3 | 30.00 | 26.10 | 17.20 | 13.60 | 10.40 |
| Particulate 4 | — | 13.00 | 14.00 | 15.00 | 13.00 |
| A-1100 (amino-propyltrimethoxysilane | 0.20 | 0.20 | 0.20 | 0.20 | 0.20 |
| Total | 100.00 | 100.00 | 100.00 | 100.00 | 100.00 |
| Average compressive postcure, psi | 19,410 | 26,410 | 26,774 | 26,900 | 26,440 |
| Std. deviation, psi | 447 | 747 | 514 | 409 | 811 |

[a]All compositions in wt. %.

Example

The use of the surfactant plays an important role in formulations such as these. Without surfactant, there will tend to be air in the system and ultra-high compressive strength would be very difficult to achieve. The effectiveness of surfactants for improving strength is presented in Table 8.

This particular surfactant must be added to the resin, otherwise it would react with amines (hardener). In the case of Table 8 it was added to the aggregate as the initial screening process.

TABLE 8

The difference of use of the surfactant in the same formula (3-076)

| Formula | A | B | C |
|---|---|---|---|
| Surfactant A[a] wt. % (aggregate basis) | — | 0.2 | — |
| Surfactant B[b] (oil) wt. % (aggregate basis) | — | — | 0.2 |

TABLE 8-continued

The difference of use of the surfactant in the same formula (3-076)

| Formula | A | B | C |
|---|---|---|---|
| Compressive strength, psi per ASTM 579B | 22,750 | 26,430 | 26,050 |
| Standard deviation, psi | 283 | 299 | 297 |

[a]Modaflow ® Resin, Acrylic Copolymer, Allnex USA Inc.
[b]Mineral Oil CP 70T, Univar

Example

Applicants have discovered, surprisingly, that final properties are greatly improved when the dry aggregate is pretreated with an adhesion promoter before mixing with the resin and hardener. The use of adhesion promoters in epoxy systems is well known; they are used for many purposes and generally not directly related to compressive strength. However, it is not known in the construction industry to pretreat aggregate directly with adhesion promoter to achieve higher compressive strength. Because the adhesion promoter is a liquid, conventional practice, driven by convenience, is to mix it in one of the liquid components (Part A or Part B). As noted above, the type of adhesion promoter will determine whether it is best added to Part A or Part B. Results are summarized in Table 9, where it can be seen that adding the promoter to the dry aggregate produced a gain of about 1,000 psi (or about 4%) in each of the two aggregate formulations tested.

TABLE 9

Effect of adhesion promoter on compressive strength for mode of application: on aggregate or liquids.

| Formula | A | B | C | D |
|---|---|---|---|---|
| Adhesion promoter applied on aggregate | Y | Y | — | — |
| Adhesion promoter in the liquids | — | — | Y | Y |
| Surfactant level in resin, % | 2 | 1 | 2 | 1 |
| Compressive strength, ASTM 579B, psi | 26,860 | 26,462 | 25,480 | 25,220 |
| Standard deviation, psi | 307 | 278 | 210 | 292 |

During the process of making the blend of the particulates the adhesion promoter is typically added on the top of the first particulate added to the mixer. The addition time of the other components, with some additional mixing, allows the adhesion promoter to be uniformly applied on the surface of the particulates. The optimal amount was determined by increasing the amount of additive until no further increase in cured strength was obtained. During the mixing process, a faint odor of methanol was observed, verifying that the adhesion promoter was reacting with OH groups on the particle surfaces. After mixing, the pretreated aggregate looks and flows like a dry powder and does not clump when compressed lightly.

Example

As noted earlier, excessive amounts of adhesion promoter (beyond what can bind to aggregate surfaces) may have a deleterious effect on the strength of the polymer network. Table 10 shows that for one particular aggregate batch, above 0.4%, further increasing the amount of adhesion promoter reduces the final compressive strength. Note that a preferred amount of adhesion promoter of, say, 0.2 wt. % in the aggregate would correspond to about 2 wt. % (liquids basis) were it added to the Part A or Part B as is conventionally done, because in this example the liquids only comprise 10% of the total.

TABLE 10

Dependency of strength vs. level of adhesion promoter in treated aggregate.

| | Level of adhesion promoter, % | | | | | |
|---|---|---|---|---|---|---|
| | 0 | 0.1 | 0.2 | 0.4 | 0.8 | 1.2 |
| Compressive strength, psi | 26,313 | 28,130 | 28,166 | 28,179 | 26,772 | 25,394. |

It will be appreciated that, ceteris paribus, an epoxy grout with a higher solids loading will have somewhat higher thermal mass, which is helpful for managing the exothermic heat generated upon curing. However, perhaps the most important thermal benefit here is simply the fact that the inventive grout contains significantly less resin per unit volume because of the correspondingly greater aggregate load. So there is correspondingly less heat generated per unit volume upon curing. The following example describes tests that showed the curing behavior in very thick sections.

Example

Figure 7:
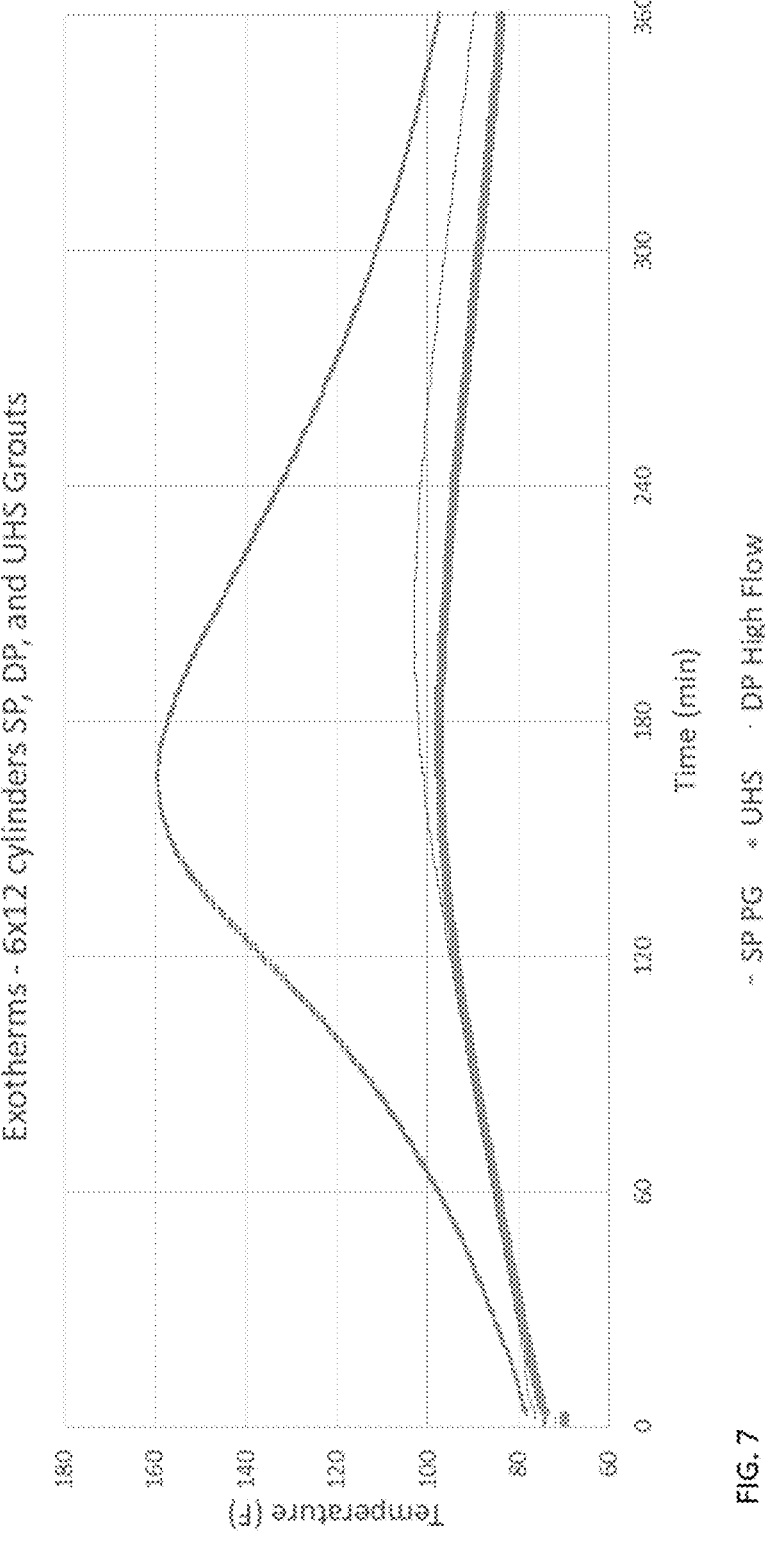
FIG. 7 is a plot of cure exotherms of three grout formulations cured in thick sections. Temperatures measured in ° F., and time from mixing measured in minutes.

Curing thick sections with high aggregate content. Referring to FIG. 7 and Table 11, Applicants compared the exotherms of three products all of which have a measured flow below 60 sec (using the small 2″ flow box familiar in the art). UHS (ultra high strength) designates the highly filled material formulation XP 230. This showed the lowest exotherm, as expected (medium gray data). The same hardener for XP was used in SP PG because the liquid chemistry was similar. The exotherm (dark gray data) is much higher, about 160° C. vs. 100° F. Formulation DP uses a different hardener and it was formulated to have lower exotherm, (light gray data) but the exotherm is still somewhat higher than that of XP 230. Each sample was a cylinder 6 in. diameter×12 in. tall, with a thermocouple placed in the center of the cylinder.

TABLE 11

Effect of aggregate loading on exotherm during cure.

| Batch | Aggregate loading, vol. % | Maximum exotherm, ° F. |
|---|---|---|
| SP PG | 71.49 | 159 |
| DP High Flow | 74.09 | 102 |
| XP 230 (UHS) | 79.48 | 97 |

The inventive material not only provides a grout body that is strong enough to eliminate the need for the conventional steel ring, but further provides a better transition between the strength characteristics of the steel tower and the concrete foundation, and a better thermal expansion match, as summarized in Table 12. For this application, preferred values of CTE are no more than 14 µstrain/° F. and more preferably less than 11.

Applicants have discovered further that the inventive material has a very high elastic modulus of at least 24 and more preferably at least 30 GPa, and comparable to that of the concrete foundation Table 12. This has important benefits for the intended use as a load spreading element in tower foundations, and could further enable other applications where a stiffer polymer concrete or gout is desirable.

TABLE 12

Properties of tower, grout, and foundation materials.

| | Tower base (carbon steel) | Grout (>80% solids loading) | Concrete foundation |
|---|---|---|---|
| Strength, psi | 48,000[a] | 26,860 | 6500-7500 |
| CTE, µstrain/° F. | 5-9 | 9.6[b] | 4-7 |
| Compressive Elastic modulus, GPa | 200 | 37.2[c] | 31-35 |

[a]Yield strength
[b]Measured per ASTM C531 between 40-140° F. (4-60° C.)
[c]Measured per ASTM C469 on a 3 × 6″ cylinder Cost Savings of High Aggregate Grout.

The high aggregate density means the invention uses less liquids. Table 13 compares new XP formula to the two conventional FSP products: DP Epoxy Grout and SP Grout Pump Grade (SPPG). All three formulas are using similar viscosity liquid systems so one can compare the effects of different aggregates, their bulks and gradation. Note: SPPG does not have any coarse aggregate. Adhesion promoter would add cost, but it does increase the performance so less expensive liquids can be used for future products/improvements. It can be seen from the table that the cost of the liquids in the inventive composition (XP) is only 81.6% of that in DP and only 72.0% of that in SPPG. It must be noted that besides the savings when two products are compared, DP and XP, XP offers almost double the strength which leaves a lot of room for possible formulating with either lower cost or lower strength liquids with the XP Aggregate formula. That would allow for even further savings and possibility of different product branching.

TABLE 13

Liquids drive the cost of grout products.

| | DP | SPPG | XP |
|---|---|---|---|
| Aggregate, lb | 200.0 | 176.0 | 250.0 |
| Liquids, lb | 27.2 | 27.3 | 25.1 |
| Total, lb | 227.2 | 203.3 | 275.1 |

TABLE 13-continued

| | | Liquids drive the cost of grout products. | |
| --- | --- | --- | --- |
| | DP | SPPG | XP |
| Yield, ft³ | 1.75 | 1.55 | 1.98 |
| Agg. bulk density in kit | 74.09 | 71.49 | 79.48 |
| 1 ft³ calculations | | Normalized use to 1 ft³ | |
| Aggregate, lb | 114.29 | 113.55 | 126.26 |
| Liquids, lb | 15.54 | 17.61 | 12.68 |
| | 100% | | 81.6% |
| Relative cost of liquids[a] | | 100% | 72.0% |

[a]Cost of liquids required in XP versus DP and SPPG, respectively

Preparation and Use of Grout Kits.

As noted above, one application for which the inventive grout composition is particularly suitable is in the foundation for a wind tower. Comparing FIG. 2 with FIG. 1 it can be seen that the invention replaces a thin layer of grout 3 plus a steel ring 6, with a single thick layer of ultra-high strength grout 3'. In such applications, the grout may be conveniently supplied in kit form, where the kit contains premeasured quantities of Part A (resin), Part B (hardener) and Part C (dry aggregate pretreated with adhesion promoter). Each kit yields a known volume of grout, so the installation contractor can easily calculate the number of kits needed for one tower base.

Example

Figure 2:
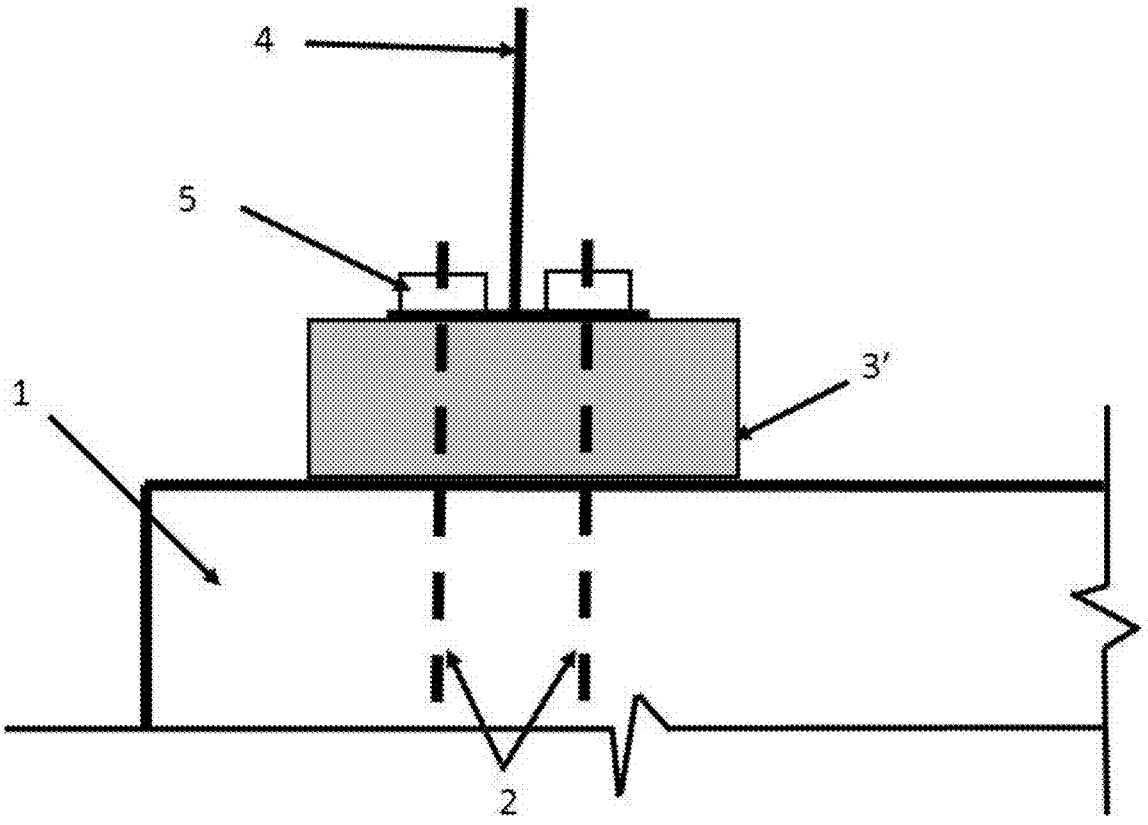
FIG. 2 is a schematic diagram of a transition structure in accordance with some aspects of the present invention, in which a thick slab of grout eliminates the need for a steel spreader plate.
Figure 4:
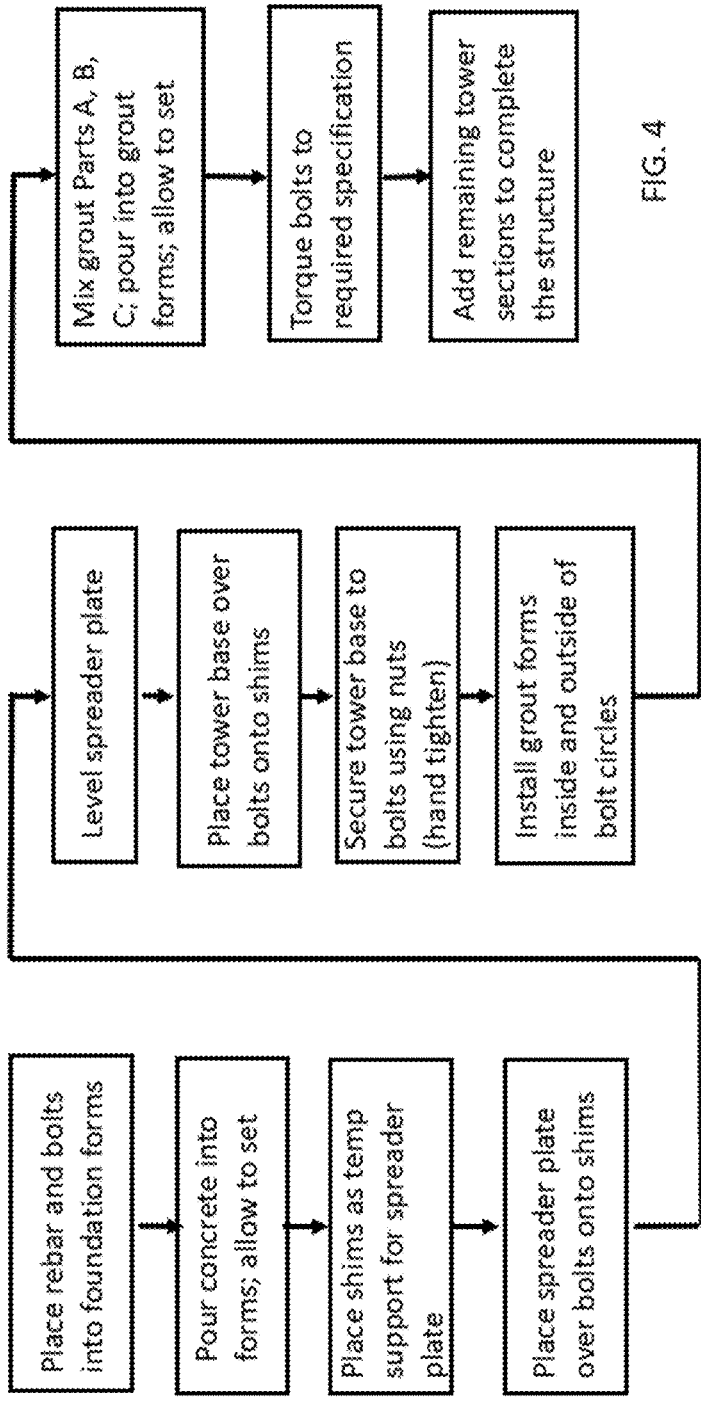
FIG. 4 is a flow chart of a method for field installation of polymer grout to form a transition structure in a tower foundation in accordance with some aspects of the present invention.

As shown in FIG. 2, and described in FIG. 4, reinforced concrete tower foundation 1 is poured in place and allowed to set for a prescribed time. The foundation has two concentric rings of bolts 2 extending vertically upward. Formworks are placed in two rings defining the inner and outer diameters of the polymer grout body 3' to be poured, which will partially encase the two rings of bolts. The kits are opened and the three components are thoroughly mixed and then poured into place between the outer and inner forms, continuing around the circumference until the entire formworks are filled to a level that leaves a sufficient length of the bolts extending past the grout. Vibration may be employed to hasten settling and leveling of the grout before curing. After curing, the formworks are removed. The bottom section of the tower 4 is placed on the grout body and secured to the bolts 2 using nuts 5, as shown schematically in FIG. 2.

Figure 3:
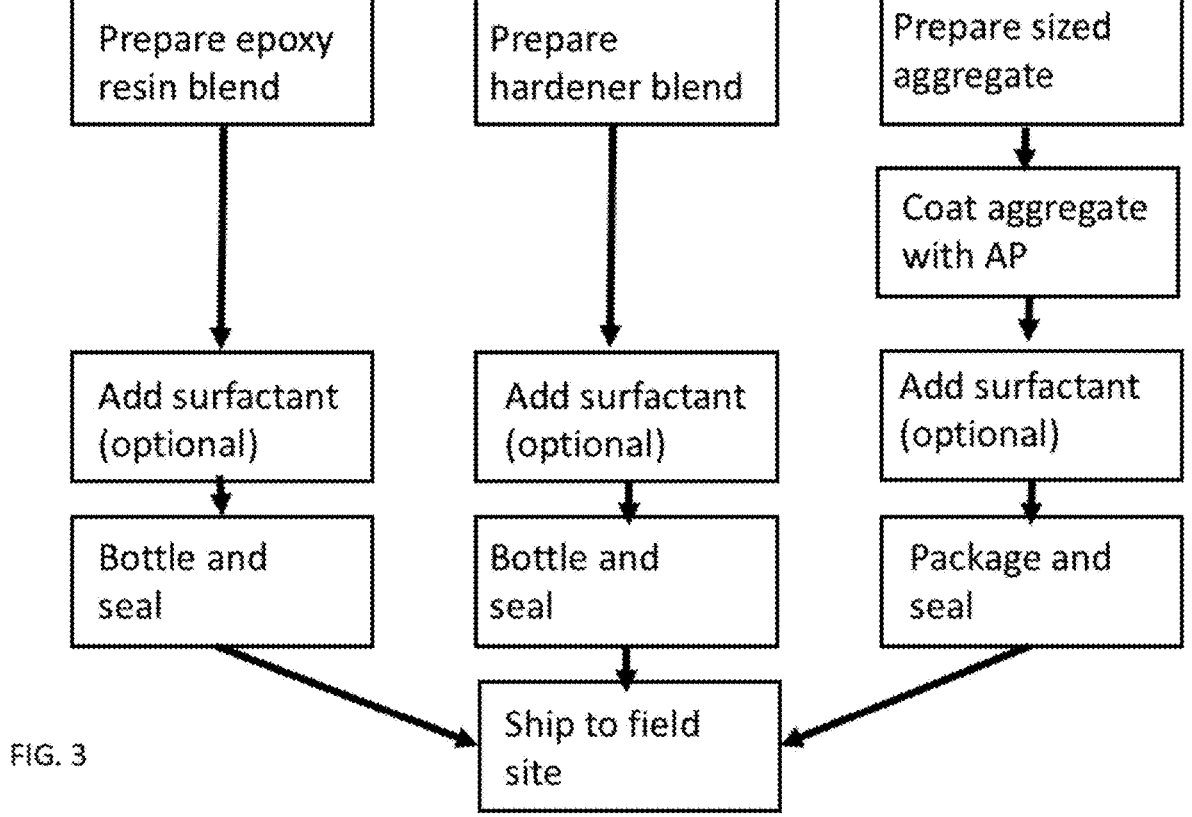
FIG. 3 is a flow chart of a method for preparing a grout kit for use in tower foundations in accordance with some aspects of the present invention.

A typical kit for making the grout mixture would contain the following: a sealed, 2-gallon plastic bucket containing about 19.6 lbs. of Part A; a sealed, 1-gallon plastic bottle containing about 5.5 lbs. of Part B; and 250 lbs of aggregate (Part C) in five 50-lb. packages. The aggregate is preferably a blended mixture of coarse, intermediate, and fine filler. One kit, in this case, contains five 50-lb. bags of aggregate instead of one 250-lb. bag simply for ease of handling by the user. Either option is considered within the scope of the invention. Any suitable package may be used, including paper sacks, plastic sacks, buckets, pails, etc. The steps of preparing a kit are shown in FIG. 3

A large tower having a base diameter of 14 ft would use about 30 ft 3 of grout mix, or about 20 kits. In the industry, grout kits are traditionally shipped to the construction site on pallets, with typically 12 kits per pallet.

Shaped Epoxy Composite Shims

Prior to the setting of the tower base or, in the case of large towers, a spreader plate, shims are placed on top the concrete foundation between the concentric circle of anchor bolts. The number of shims and their thickness is determined by the engineer.

Figure 8A:
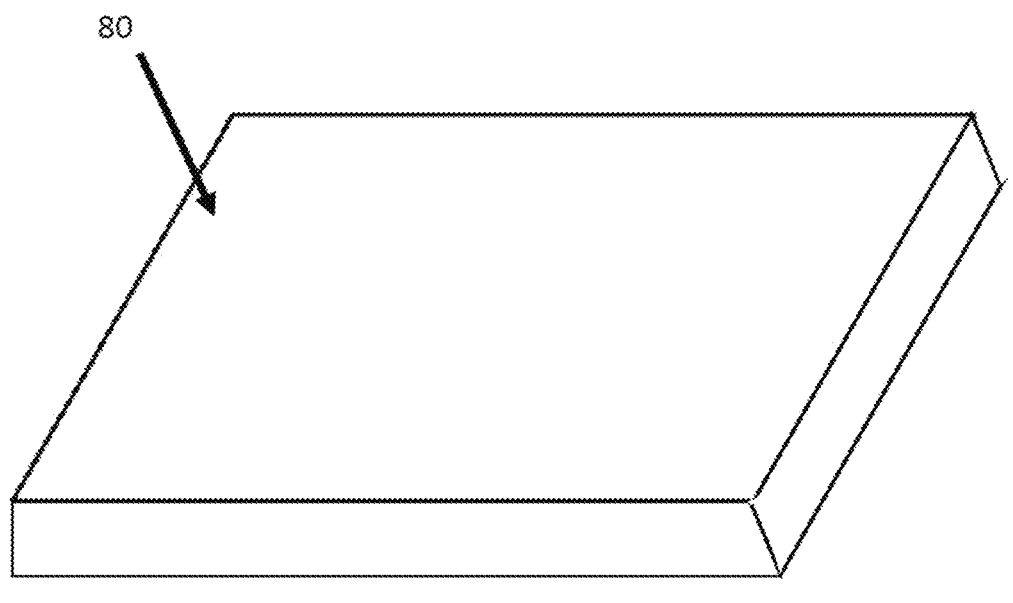
FIG. 8A-B is a schematic illustration of a conventional steel foundation shim system.
Figure 8B:
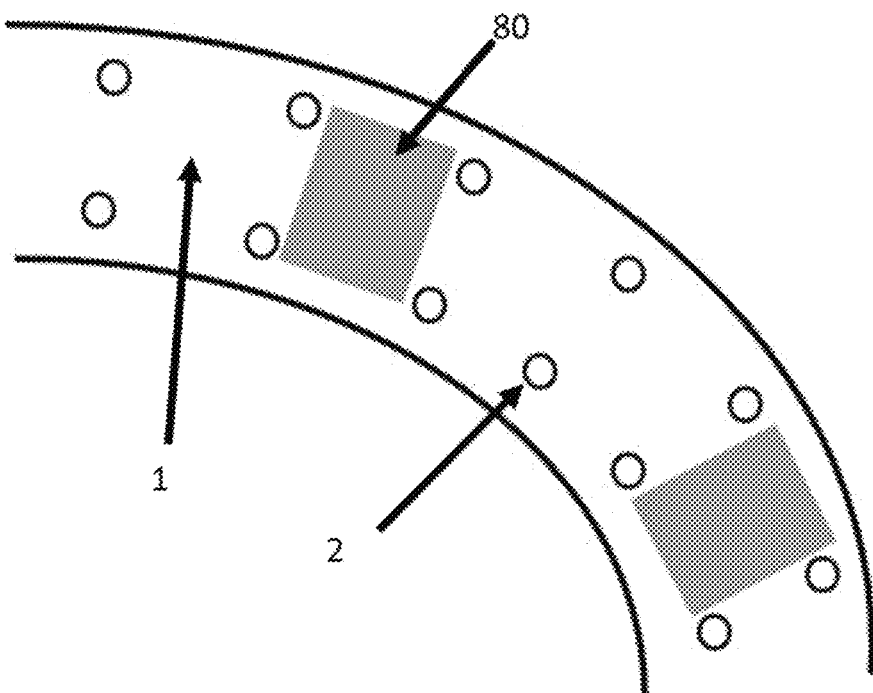

Shims are conventionally made of steel and are rectangular in shape. Their dimensions are typically 4 in. wide by 10 in. long and 1 in. thick, although this can vary. The shims are stacked on the concrete to provide the desired thickness for the grout layer to be installed later. It is typical that the shims are placed between the anchor bolts and there is typically minimal clearance between the shims and the adjacent anchor bolts on both concentric circles of bolts, as shown schematically in FIGS. 8A-B. The shims 80 are designed to extend toward both the inside diameter and outside diameter or the tower base sufficiently to provide a stable base until the grout layer is poured but not so far as to be insufficiently covered by the grout layer. Typically, the shims are of such a length that the outside edge is lined up with the arc of the exterior ring of anchor bolts and the inside edge is lined up with the arc of the interior ring of anchor bolts.

Grout is poured into the space created by the shims above the foundation and below the tower base or the spreader plate. The grout must flow around all the anchor bolts and around all the shims to completely fill the space thereby creating a uniform layer on which the tower will rest.

The typical shape and composition of the steel shims 80 creates potential problems in three areas.

First, because of their rectangular shape, and the way they are positioned between the anchor bolts, the shims and anchor bolts form a "pinch point" which constricts the flow of grout and potentially leaves a void in the grout structure.

The second problem arises from the fact that the shims are made from a different material than the grout that surrounds them. Normal ambient temperature fluctuations during the life of the wind tower will make all the materials used in the construction expand and contract based on their individual coefficients of thermal expansion (CTE). The steel shims have a different CTE than the grout in which they are embedded. That induces stresses in the grout layer that can lead to cracking.

The third problem arises from the fact that the rectangular shims typically have square corners. Square corners tend to concentrate stresses during dimensional changes caused by temperature fluctuations. These stresses can cause the grout layer to crack. It is typically recommended that shims have rounded corners but because of the high cost and difficulty of machining steel, in practice this is rarely if ever done.

Example

Figure 9A:
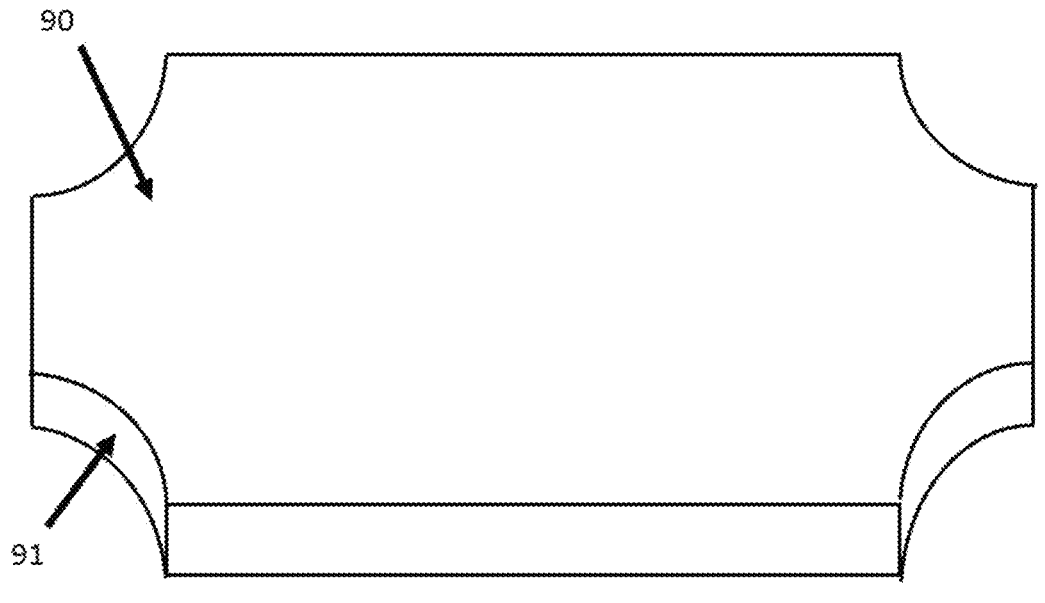
FIG. 9A-B is a schematic illustration of a precast ultra high strength epoxy composite foundation shim system.
Figure 9B:
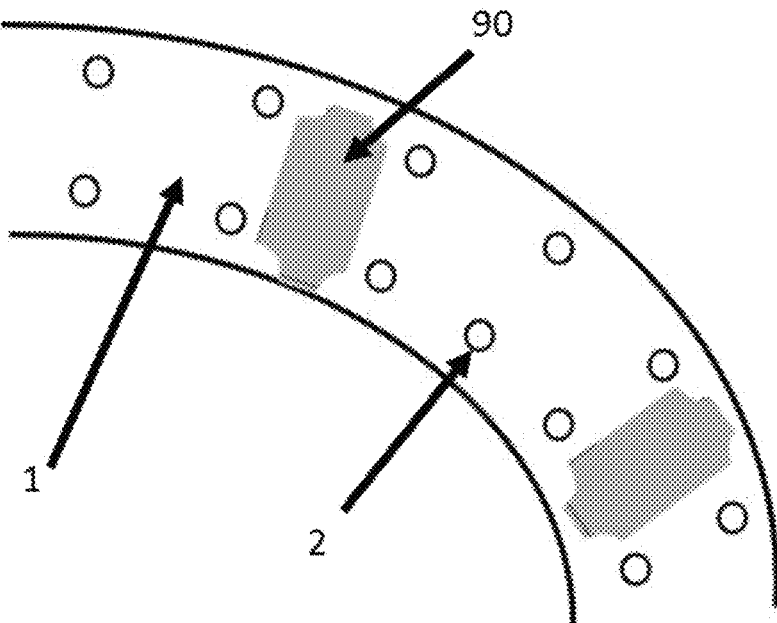

Applicants contemplate casting shims of selected shapes, as shown schematically in FIGS. 9A-B, using the ultra high compressive strength epoxy of the present invention. Such shims will reduce the potential for cracks forming in the grout layer. They may have rounded corners or other shape modifications to avoid any stress concentrations, and because they are made from the same material as the surrounding grout there is no mismatch between the CTE of the grout and the CTE of the shims. Any temperature induced dimensional change would be consistent throughout the grout layer system.

The shaped shims 90 would preferably have "cut-outs" 91 at their corners to provide more space for the grout to flow between the shims and the anchor bolts 2 while still maintaining the stability provided by the extension of the edges of the shims to the interior and exterior arcs of the anchor bolts. This eliminates the pinch points and their associated risk of causing voids in the grout layer.

It will be understood by the skilled artisan that shim 90 is a prismatic body that may be cast into virtually any desired outline for particular situations. The corners may have a concave cutout 91, as shown; however, the corners may be rounded (convex) or beveled, all edges may be rounded or chamfered, and holes may be formed so that the shim 91 can be placed with bolts 2 passing therethrough.

The shaped shims can be cast in any thickness which avoids the requirement that an installer stacks 1 in. shims to the specified thickness. This can speed installation and make the process of leveling the tops of the shims easier. The shims can be precast at the factory to any selected shape; unlike a steel shim, once the mold is made the polymer shims can be cast in complex shapes without incurring the repetitive cost and material waste that would be associated with machining steel shims individually.

The advantages of shaped epoxy shims are realized whether a tower uses a steel spreader plate or not.

Example

The size of a particular tower and the thickness of the grout layer will determine the number of grout kits needed, as described above. It follows from this that there will be a relationship between the number of grout kits and the number of shims needed for the same installation. For this reason, a shipment of grout kits may conveniently include the appropriate number of precast shims, of a selected shape and of the same composition as the grout kits, thereby offering the user a perfect match of physical properties between shims and grout.

Although the concrete will have a marginal tensile strength (500 psi) and flexural strength (800-1600 psi), epoxies are known to be much stronger. However, epoxies are known to have much lower elastic modulus than concrete. XP 230 shows (Table 14) the highest tensile and flexural strengths of all listed. Most likely the superior numbers are due to the shear fact of very high bulk loading, presence of adhesion promoter and/or as a combination of the invention's attributes listed in this patent application. By having XP 230 with matching a concrete modulus values and high tensile and flexural strength will give you the best material of the both worlds.

We claim:

1. A three-part epoxy grout composition comprising:

a liquid epoxy blend comprising a material selected from the group consisting of: diglycidyl ether epoxy resins of bisphenol A, bisphenol F, bisphenol E, bisphenol S, novolacs, and reactive diluents including aliphatic and aromatic mono-, di-, and tri-glycidyl ethers thereof;

a liquid hardener comprising a material selected from the group consisting of: cyclohexanemethanamine, 5-amino-1,3,3-trimethyl, any cycloaliphatic mono-, di-, and tri-amine, isophoronediamine (IPDA), aliphatic amines, and aromatic amines; and, a graded particulate aggregate comprising sand and fine filler, wherein said aggregate particles are pretreated with an adhesion promoter in an amount of 0.01 to 5% by weight, wherein the adhesion promoter is selected from the group consisting of: amino functional silanes, glycidoxy functionalized silanes, (meth)acrylic func-tionalized silanes, and other reactive functionalized silanes, and, the volume of said pretreated aggregate particles, when mixed with said epoxy blend and said hardener, form-ing a cured grout, comprises at least 70% by volume of the cured grout, wherein the grout composition is characterized by the following properties in the fully cured state: a compressive strength of at least 19,000 psi, a coefficient of thermal expansion of no more than 14 µstrain/° F., and an elastic modulus of at least 24 GPa.

2. The grout composition of claim 1 wherein at least one of said liquid epoxy blend and said liquid hardener further comprises a surfactant selected from the group consisting of: 2, 6-dimethylheptan-4-one, 4,6-dimethyl-2-heptanone, min-eral oil, and benzyl alcohol.

3. The grout composition of claim 1 wherein said graded particulate aggregate comprises:

coarse sand in a size range of −6+16 mesh;

intermediate sand in a size range of −16+40 mesh;

fine sand in a size range of −40+140 mesh; and, fine filler.

TABLE 14

Comparative Flexural and Tensile Strengths and Elastic Modulus of Epoxy Grouts
Comparative Flexural and Tensile Strengths and Elastic Modulus of Epoxy Grouts

| | Standard Epoxy Grout | High Strength Epoxy Grout | Ultra-High Strength Epoxy Grout |
|---|---|---|---|
| Flexural Strength, psi (MPa)[a] | 4000 (27.6) | 5500 (37.9) | 6500 (44.8) |
| Tensile Strength, psi (MPa)[b] | 2000 (13.8) | 2300 (15.8) | 2700 (18.6) |
| Compressive Elastic Modulus, psi (MPa)[c] | $2.5 \times 10^6$ (17.2) | $3.7 \times 10^6$ (25.5) | $5.4 \times 10^6$ (37.2) |

[a]Measured per ASTM C580
[b]Measured per ASTM C307
[c]Measured per ASTM C469 on a 3 × 6" cylinder

4. The grout composition of claim 3 wherein said graded particulate aggregate comprises:

30-70 wt. % coarse sand in a size range of −6+16 mesh;

10-40 wt. % intermediate sand in a size range of −16+40 mesh;

5-30 wt. % fine sand in a size range of −40+140 mesh; and, balance fine filler.

5. The grout composition of claim 1 further having an aggregate loading of at least 75% by volume.

\* \* \* \* \*